US008176625B2

(12) United States Patent
Copper et al.

(10) Patent No.: US 8,176,625 B2
(45) Date of Patent: May 15, 2012

(54) ELECTRICAL CONNECTOR ASSEMBLY TOOL

(75) Inventors: Charles D. Copper, Hummelstown, PA (US); Barry James Johnson, Vaughan (CA); Dmitry Ladin, Thornhill (CA)

(73) Assignees: Tyco Electronics Corporation, Berwyn, PA (US); Tyco Electronics Canada ULC, Ontario (CA)

(*) Notice: Subject to any disclaimer, the term of this patent is extended or adjusted under 35 U.S.C. 154(b) by 637 days.

(21) Appl. No.: 12/173,300

(22) Filed: Jul. 15, 2008

(65) Prior Publication Data

US 2010/0011571 A1 Jan. 21, 2010

(51) Int. Cl.
*B23P 19/00* (2006.01)
*H01R 4/44* (2006.01)

(52) U.S. Cl. ................ 29/749; 29/750; 29/755; 29/758; 29/762; 439/781

(58) Field of Classification Search .................... 29/750, 29/758, 754, 749, 759, 566.4, 33 M; 439/783, 439/781, 782, 863, 775, 409, 403
See application file for complete search history.

(56) References Cited

U.S. PATENT DOCUMENTS 2,868,051 A 1/1959 Dupre et al.
3,292,665 A 12/1966 Broske
3,458,996 A 8/1969 Mixon, Jr. et al.
3,513,884 A 5/1970 Demler, Sr.
3,516,050 A 6/1970 Mixon, Jr. et al.
5,692,930 A * 12/1997 Garver et al. ................. 439/781
6,565,375 B1 * 5/2003 Daoud et al. .................. 439/409
7,182,653 B1 * 2/2007 Hoxha .......................... 439/783
7,309,263 B2 12/2007 Copper et al.
2007/0270046 A1 * 11/2007 Copper et al. ................ 439/781

FOREIGN PATENT DOCUMENTS

GB 2065995 7/1981

OTHER PUBLICATIONS

International Search Report, International Application No. PCT/US2009/004007, International Filing Date Sep. 7, 2009.

* cited by examiner

*Primary Examiner* — Derris H Banks
*Assistant Examiner* — Tai Nguyen

(57) ABSTRACT

An electrical connector tool assembly is disclosed. The tool assembly includes a conductor tool and a connector tool connected to and cooperable with the conductor tool. The tool assembly can be used in connecting a first conductor to a second conductor with an electrical connector. The tool assembly is adjustably arranged and disposed to receive and removably retain a first conductive member of an electrical connector in the connector tool and is further arranged and disposed to both to hold the second conductor in place relative to a second conductive member of the electrical connector and to prevent rotation of the second conductive member with respect to the first conductive member.

23 Claims, 8 Drawing Sheets

ELECTRICAL CONNECTOR ASSEMBLY TOOL

FIELD OF THE INVENTION

The present disclosure relates generally to tools for installing and removing electrical connectors. More specifically, the present disclosure relates to a tool assembly as used in the utility industry for the prevention of shock to utility workers.

BACKGROUND OF THE INVENTION

Electrical utility firms such as those constructing, operating or maintaining overhead and/or underground power distribution networks utilize connectors to tap main power transmission conductors and feed electrical power to distribution line conductors, sometimes referred to as tap conductors. The main power line conductors and the tap conductors are typically high voltage conductors that are relatively large in diameter and the main power line conductor may be differently sized from the tap conductor. As a result, specially designed connector components are often needed to adequately connect tap conductors to main power line conductors. Generally, three types of connectors are commonly used for such purposes: bolt-on connectors, compression-type connectors, and wedge connectors.

In the installation and removal of electrical connectors, hot stick tools reduce risk of shock and help access connectors that are difficult to reach. A hot stick tool includes a pole and a tool for adjusting a connector. The pole is an insulated pole, usually made of fiberglass or another insulated material. In addition to providing electrical insulation for the individual, the pole provides physical separation from the power lines. The physical separation reduces the chance of burns that could result from electrical arcing that may occur due to a malfunction of the power lines. The tools include mechanical systems, hydraulic systems, and pneumatic impact tools.

Generally, bolt-on connectors require a specific tool permitting the bolt to be adjusted from a safe distance. Compression connectors require a specific tool allowing for the necessary deformation of the connector. Wedge connectors often require a specific tool permitting the use of explosive cartridges packed with gunpowder to drive the wedge member of the wedge connectors into C-shaped members.

Bolt-on connectors, sometimes referred to as clam shell connectors, typically employ die-cast metal connector pieces or connector halves formed as mirror images of one another. Each of the connector halves defines opposing channels that axially receive the main power conductor and the tap conductor, respectively, and the connector halves are bolted to one another to clamp the metal connector pieces to the conductors. Bolt-on connectors have been widely accepted in the industry primarily due to their ease of installation, but such connectors are not without disadvantages. For example, proper installation of such connectors is often dependent upon predetermined torque requirements of the bolt connection to achieve adequate connectivity of the main and tap conductors. Applied torque in tightening the bolted connection generates tensile force in the bolt that, in turn, creates normal force on the conductors between the connector halves.

Compression connectors may include a single metal piece connector that is bent or deformed around the main power conductor and the tap conductor to clamp them to one another. Such compression connectors are generally available at a lower cost than bolt-on connectors, but are more difficult to install. Hand tools are often utilized to bend the connector around the conductors. In addition, because the quality of the connection is dependent upon the relative strength and skill of the installer, widely varying quality of connections may result.

Wedge connectors include a C-shaped channel member that hooks over the main power conductor and the tap conductor. Wedge connectors also include a wedge member having channels on opposing sides configured to be driven through the C-shaped member, deflecting the ends of the C-shaped member and clamping the conductors between the channels in the wedge member at the ends of the C-shaped member. Such connectors tend to be more expensive than either bolt-on or compression connectors, but are generally believed to provide superior performance over bolt-on and compression connectors. For example, such connectors include a wiping contact surface that, unlike bolt-on and compression connectors, is stable, repeatable, and consistently applied to the conductors, and the quality of the mechanical and electrical connection is not as dependent on torque requirements and/or relative skill of the installer.

U.S. Pat. No. 7,309,263 (the '263 patent), which is herein incorporated by reference but not intended as limiting, discloses an assembly comprising a first conductive member comprising a first hook portion and a first base wedge portion, the first hook portion extending from the first wedge portion and adapted to engage a first conductor. A second conductive member is also disclosed that comprises a hook portion and a wedge portion; the hook portion extending from the wedge portion and adapted to engage a second conductor. The wedge portion of the first conductive member and the wedge portion of the second conductive member disclosed in the '263 patent are adapted to nest with one another and be secured to one another. The assembly disclosed in the '263 patent further comprises a displacement stop that is located on at least one of the first and second conductive members. The displacement stop is positioned to define a final displacement relation between the first and second conductive members once fully mated. The displacement stop defines a final mating position between the first and second conductive members independent of an amount of force induced upon the first and second conductors by the first and second conductive members.

The style of electrical connector disclosed in the '263 patent cannot easily be installed using any existing hot stick tool due to the differences between it and more traditional bolt-on connectors, compression-type connectors and wedge connectors. In addition, newer connectors, such as those disclosed in the '263 patent, include features of each of the bolt-on connectors and wedge connectors. Existing hot stick tools are not able to adequately accommodate such a combination of features. While installing such electrical connectors by other means, such as wearing rubber or insulated gloves, is possible, such methods frequently are not permitted based upon local law and/or labor contracts.

Therefore, there is an unmet need to provide a hot stick tool capable of being used for installation of certain types of electrical connectors.

SUMMARY OF THE INVENTION

This disclosure relates to an electrical connector tool assembly, a conductor tool and a connector tool that meets one or more of those unmet needs.

According to an embodiment, an electrical connector tool assembly includes a conductor tool and a connector tool connected to and cooperable with the conductor tool. The assembly is for use in connecting a first conductor to a second conductor with an electrical connector. The tool assembly is adjustably arranged and disposed to receive and removably retain a first conductive member of an electrical connector in the connector tool. The tool assembly is also arranged and disposed to hold the second conductor in place relative to a second conductive member of the electrical connector and to prevent rotation of the second conductive member with respect to the first conductive member.

According to another embodiment, a connector tool includes an arm portion adapted to be attached to a hot stick. The arm portion comprises a mechanism arranged and disposed to releasably retain an electrical connector having a first conductive member connected to a second conductive member by a fastener, a guide surface arranged and disposed to receive the first conductive member of the electrical connector, and a guide recess arranged and disposed to receive a fastener head. The connector tool is arranged and disposed to be cooperable with a second tool for installing the electrical connector.

According to yet another embodiment, a conductor tool for use with an electrical connector having a first conductive member connected to a second conductive member by a fastener having an axis is disclosed in which the conductor tool comprises a base adapted to be attached to a hot stick and at least one retention member extending away from the base and configured to hold a conductor in place with respect to the second conductive member. The conductor tool is cooperable with a second tool to install the electrical connector.

An advantage of the present invention is the increased ability to avoid electrical shock when installing specific electrical connectors.

Another advantage of the present invention is the ability to prevent a connector from spinning around a bolt.

Yet another advantage of the present invention is the providing of compliance.

Still yet another advantage of the present invention is the ability to limit movement to substantially two-dimensional movement.

A further advantage of the present invention is the ability to permit portions of a connector to flex as the connector mates while grasping onto the connector.

Further aspects of the foregoing are disclosed herein. The features as discussed above, as well as other features and advantages of the present disclosure will be appreciated and understood by those skilled in the art from the following detailed description and drawings.

DETAILED DESCRIPTION OF THE INVENTION

The present invention now will be described more fully hereinafter with reference to the accompanying drawings, in which a preferred embodiment of the invention is shown. This invention may, however, be embodied in many different forms and should not be construed as limited to the embodiments set forth herein; rather, these embodiments are provided so that this disclosure will be thorough and complete and will fully convey the scope of the invention to those skilled in the art.

Figure 1A:
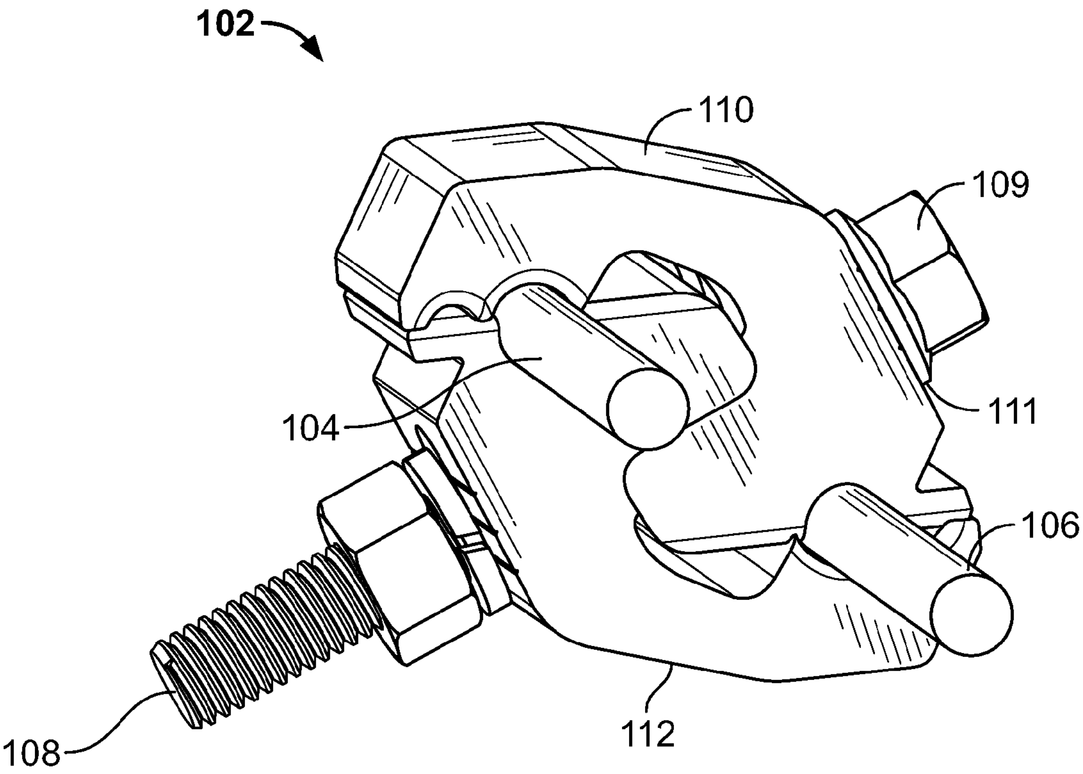
FIG. 1A illustrates an embodiment of an electrical connector in a mated position.

FIG. 1A illustrates an embodiment of an electrical connector 102 in a mated position. As illustrated, connector 102 includes two substantially similar portions configured to be used as an electrical connector for high voltage utility conductors. In some embodiments, the portions may be identical. In other embodiments, the portions may be geometrically dissimilar. Connector 102 is configured to electrically connect a main power conductor 104 and a tap conductor 106. It will be apparent that the term "main power conductor" is differentiated from "tap conductor" for explanatory purposes only and should not be considered to limit the disclosure to the exemplary configuration. In one embodiment, connector 102 is specifically configured for power utility applications wherein mechanical and electrical connections between tap conductor 106 and main power conductor 104 are to be established. Tap conductor 106 and/or main power conductor 104 (sometimes referred to as a distribution conductor) may be a known high voltage conductor having a generally cylindrical form and a multi-filamental structure. Tap conductor 106 and main power conductor 104 may be of the same conductor gauge or different conductor gauge in different applications. Connector 102 is adapted to accommodate a range of conductor gauges for each of tap conductor 106 and main power conductor 104.

When installed to tap conductor 106 and main power conductor 104, connector 102 provides electrical connectivity between main power conductor 104 and tap conductor 106 to feed electrical power from main power conductor 104 to tap conductor 106, for example, in an electrical utility power distribution system or to feed electrical power from tap conductor 106 to main power conductor 104.

Connector 102 includes a tap conductive member 112, a main conductive member 110, and a fastener 108 that couples tap conductive member 112 and main conductive member 110. As illustrated, fastener 108 is a threaded member having a head 109, which threaded member is inserted through main conductive member 110 and tap conductive member 112. In one embodiment, the fastener 108 approximates a carriage bolt with a hex-shaped head, having a square cross-sectional shoulder (not shown) intermediate the fastener shaft and a hex shaped head 109. The shoulder and head 109 may be separated by a flange 111.

Figure 1B:
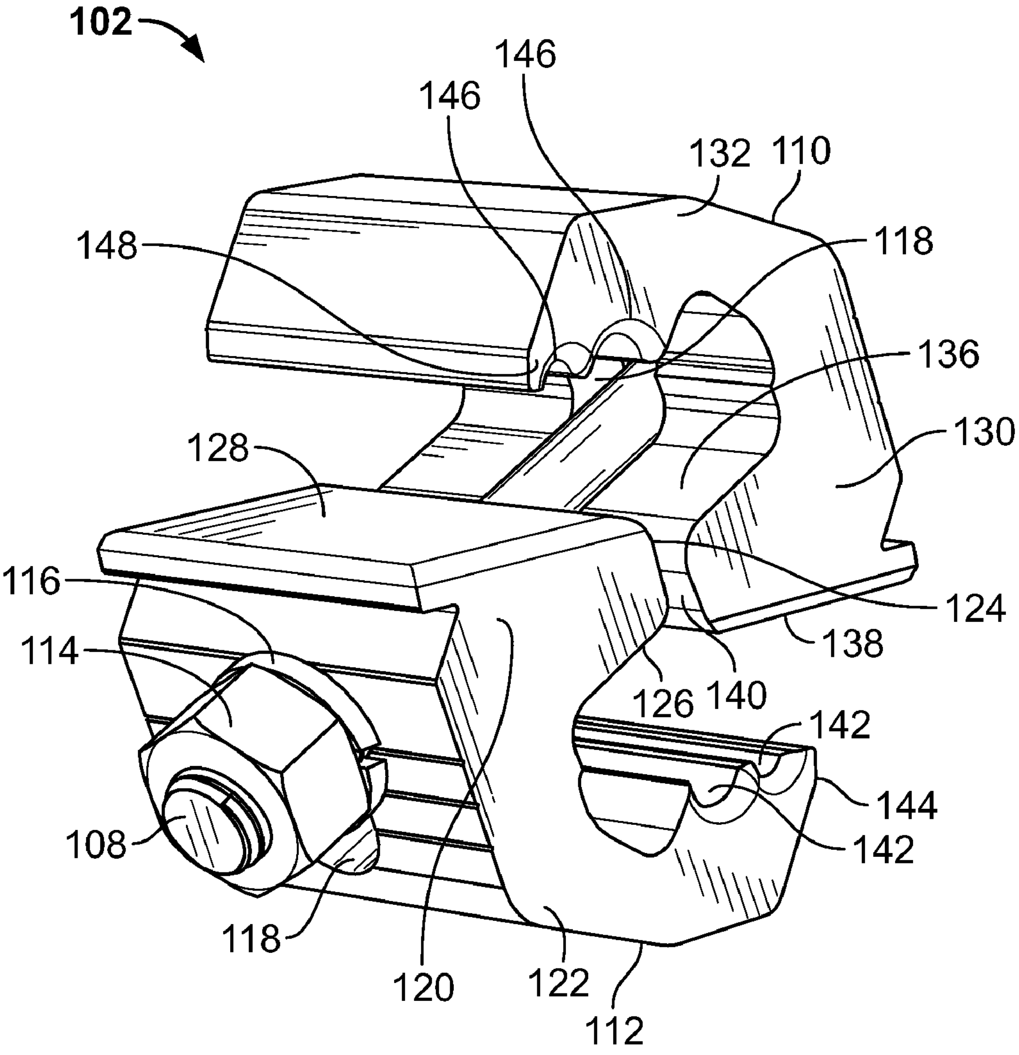
FIG. 1B illustrates an embodiment of an electrical connector in an open position.

Turning to FIG. 1B, fastener 108 is inserted through a nut 114 and a lock washer 116 permitting fastener 108 to engage tap conductive member 112 and main conductive member 110. In one embodiment, a cross-sectional area of a fastener bore 118 is larger than an outer diameter of fastener 108, thereby providing some relative freedom of movement of fastener 108 with respect to fastener bore 118. While specific fastener elements 108, 114 and 116 are illustrated in FIGS. 1A & B, it is understood that other known fastening means may be used.

Tap conductive member 112 includes a wedge portion 120 and a channel portion 122 extending from wedge portion 120. Fastener bore 118 is formed in and extends through wedge portion 120. Wedge portion 120 further includes an abutment face 124, a wiping contact surface 126 angled with respect to abutment face 124, and a conductor contact surface 128 extending substantially perpendicular to abutment face 124 and obliquely with respect to wiping contact surface 126.

Channel portion 122 extends away from wedge portion 120 and forms a channel or cradle 142 adapted to receive tap conductor 106 at a spaced relation from wedge portion 120. A distal end 144 of channel portion 122 includes a radial bend that wraps around tap conductor 106, about one-hundred-and-eighty circumferential degrees in an exemplary embodiment, such that distal end 144 faces toward wedge portion 120, and wedge portion 120 overhangs cradle 142. In one embodiment, channel portion 122 may resemble a hook and wedge portion 120 and channel portion 122 together resemble the shape of an inverted question mark. In the illustrated embodiment, two cradles 142 are illustrated; however, conductive member 112 may include one cradle 142 or any number of cradles 142. The presence of multiple cradles 142 permit connector 102 to be utilized in conjunction with a wider variety of conductor gauges, materials, and structures.

As with wedge portion 120, main conductive member 110 includes a wedge portion 130 and a channel portion 132 extending from wedge portion 130. Fastener bore 118 is formed in and extends through wedge portion 130. Wedge portion 130 further includes an abutment face 140, a wiping contact surface 136 angled with respect to abutment face 140, and a conductor contact surface 138 extending substantially perpendicular to abutment face 140 and obliquely with respect to wiping contact surface 136. Channel portion 132 extends away from wedge portion 130 and forms a channel or cradle 146 adapted to receive main power conductor 104 at a spaced relation from wedge portion 130. A distal end 148 of channel portion 132 includes a radial bend that wraps around main power conductor 104. The bend is about one-hundred-and-eighty circumferential degrees in an exemplary embodiment, such that distal end 148 faces toward wedge portion 130, and wedge portion 130 overhangs cradle 146. In one embodiment, channel portion 132 may resemble a hook, and wedge portion 130 and channel portion 132 together resemble the shape of an inverted question mark. In the illustrated embodiment, two cradles 146 are illustrated; however, conductive member 110 may include one cradle 146 or any number of cradles 146. Where multiple cradles 146 are used, they are ordinarily differently sized and each of the cradles accommodates a conductor of different gauge. The multiple cradles 146 permit connector 102 to be utilized in conjunction with a wider variety of conductor gauges, materials, and structures.

Wedge portions 120, 130 are substantially identically formed and share the same geometric profile and dimensions to facilitate mating of tap conductive member 112 and main conductive member 10. In one embodiment, channel portions 122, 132 may have different dimensions as appropriate to engage to differently sized conductors 106, 104 while maintaining substantially the same shape of tap conductive member 112 and main conductive member 110. Identical formation of the wedge portions 120, 130 may enhance versatility in choosing tap conductive member 112 and main conductive member 110 for differently sized conductors 106, 104 while achieving a repeatable and reliable connecting interface via the wedge portions 120, 130.

Referring still to FIG. 1B, wiping contact surfaces 126, 136 are configured to slidably engage, thereby producing a wiping contact interface that ensures adequate electrically connectivity. Conductor contact surfaces 128, 138 provide wiping contact interfaces with tap conductor 106 and main power conductor 104 upon mating of connector 102. When connector 102 is in the fully mated position, main power conductor 104 is captured between channel portion 132 of main conductive member 110 and conductor contact surface 128 of wedge portion 120 of tap conductive member 112. Likewise, tap conductor 106 is captured between channel portion 122 of tap conductive member 112 and conductor contact surface 138 of wedge portion 130 of main conductive member 110. When fully mated, abutment faces 124, 140 engage channel portions 122, 132 (respectively) to form a displacement stop that defines and limits a final displacement relation between tap conductive member 112 and main conductive member 110. The displacement stop defines a final mating position between tap conductor 106 and main power conductor 104 independent of an amount of force induced upon tap conductor 106 and main power conductor 104 by the main conductive member 110 and tap conductive member 112.

When abutment faces 124, 140 of wedge portions 120, 130 contact channel portions 122, 132, connector 102 is fully mated. A displacement stop allows fastener 108 to be continuously tightened until abutment faces 124, 140 fully seat against channel portions 122, 132, independent of, and without regard for, any normal forces created by tap conductor 106 and/or main power conductor 104. When connector 102 is in the fully mated position, the interference between tap conductor 106 and main power conductor 104 and connector 102 produces a contact force adequate to provide an electrical connection.

Figure 4:
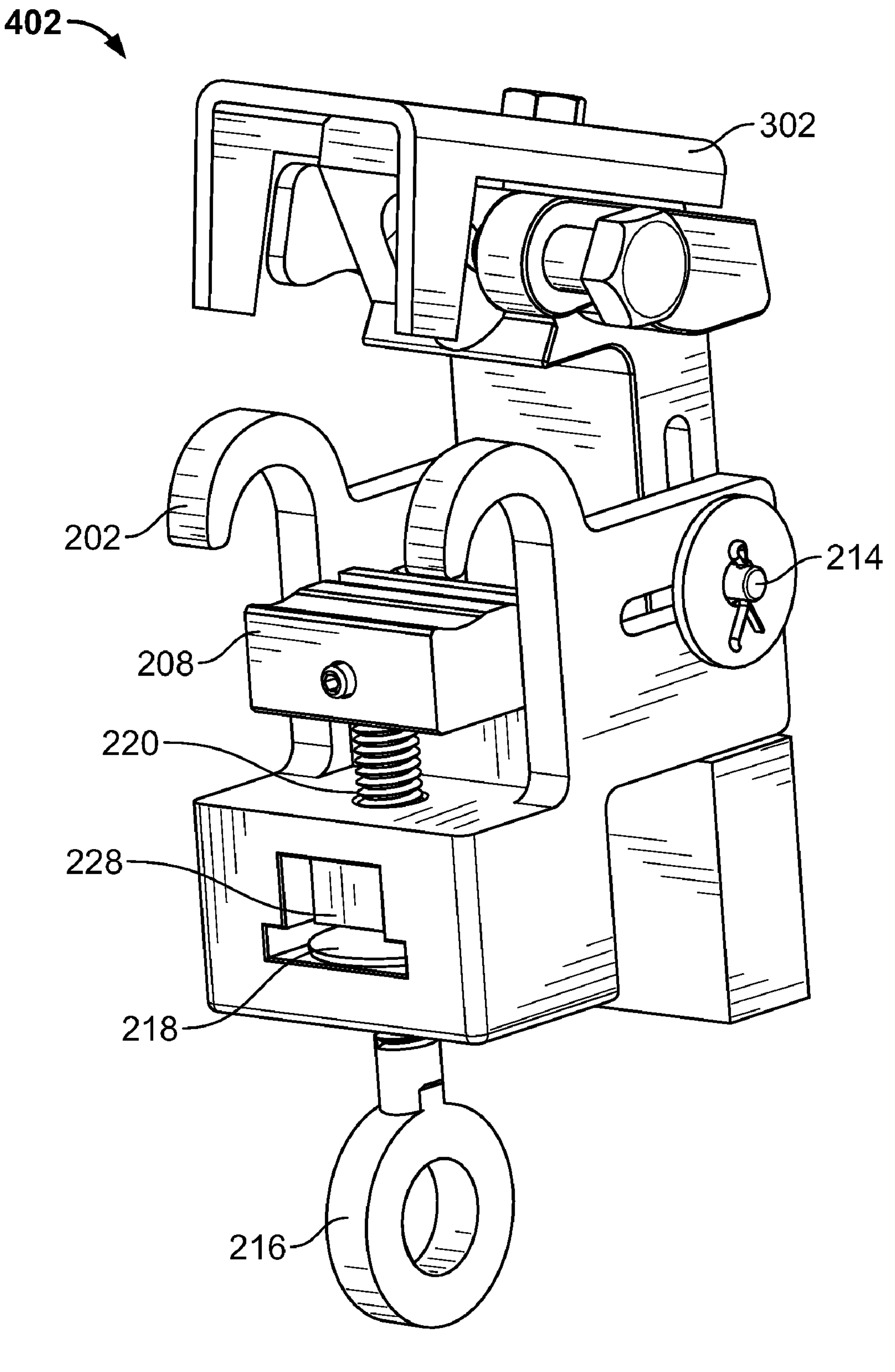
FIG. 4 illustrates an electrical connector tool assembly according to an exemplary embodiment of the invention.
Figure 5A:
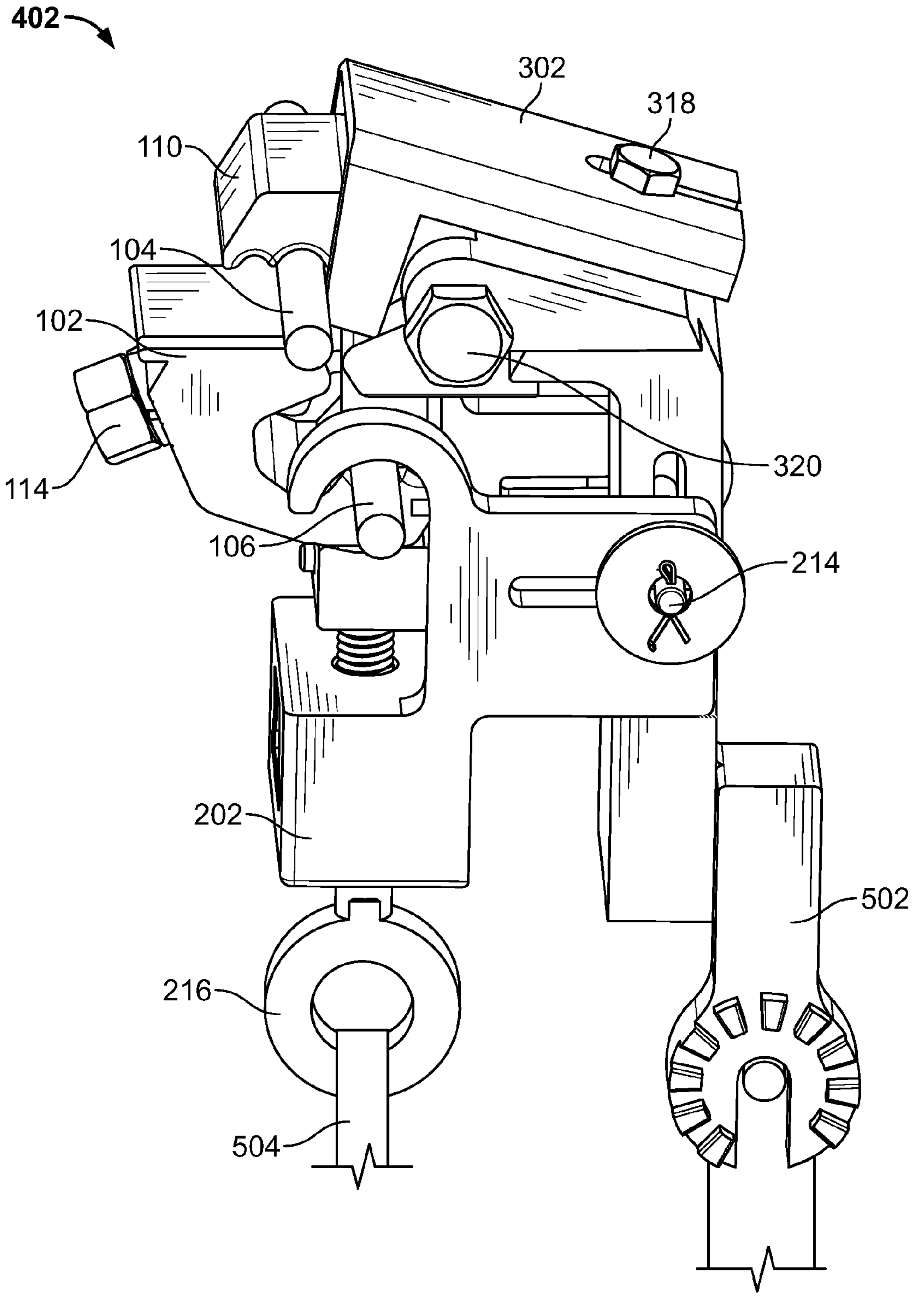
FIG. 5A illustrates an electrical connector tool assembly containing a conductor tool and a connector tool prior to closing the electrical connector.
Figure 5B:
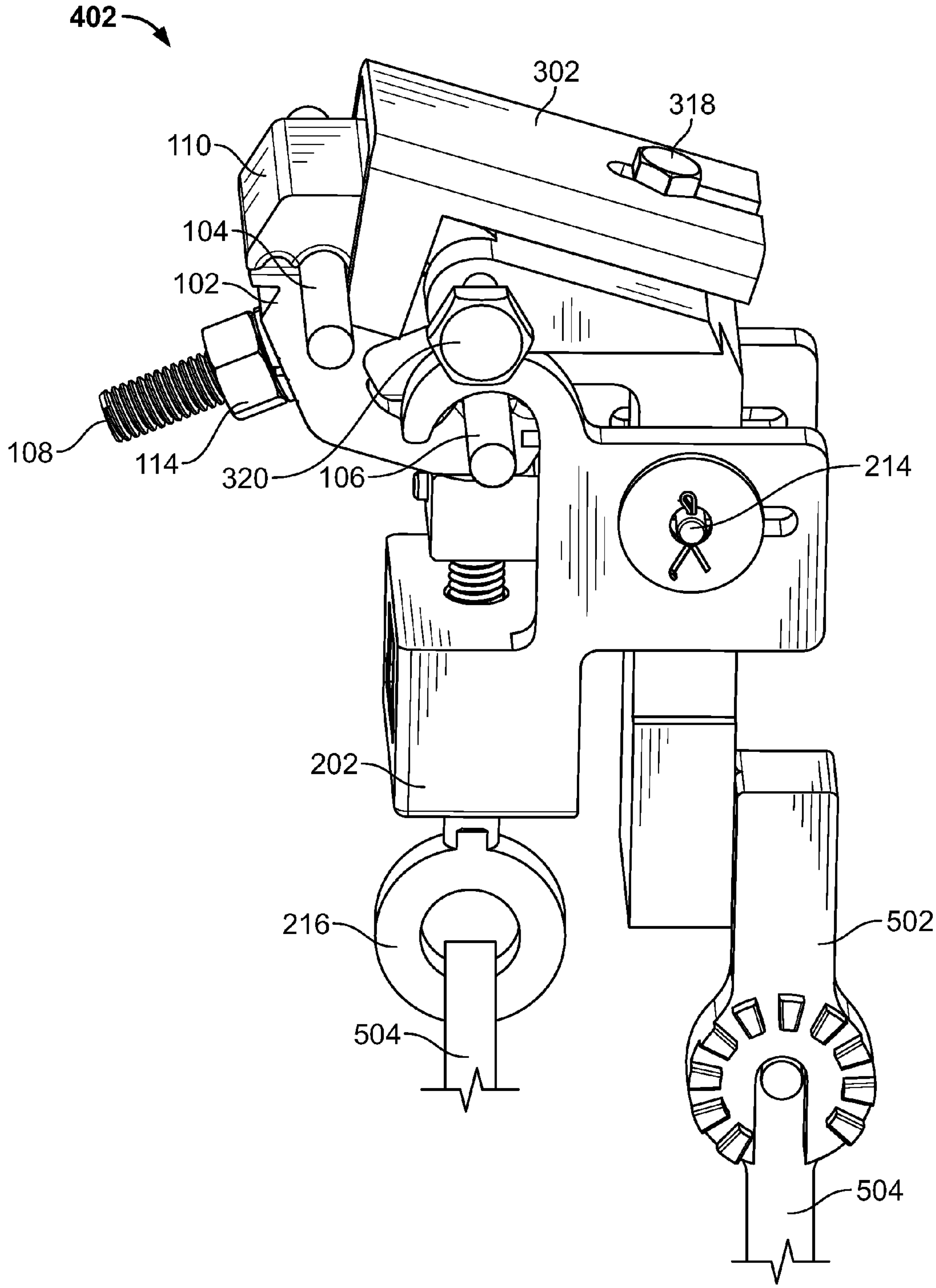
FIG. 5B illustrates an electrical connector tool assembly containing a conductor tool and a connector tool after closing the electrical connector.

FIGS. 4 and 5A & B illustrate a electrical connector tool assembly 402 for use with the installation of connector 102. In FIG. 4, electrical connector tool assembly 402 includes a conductor tool 202 and a connector tool 302 slidably attached by a pin 214. In one embodiment, electrical connector tool assembly 402 further includes a hot stick 504. As will be readily appreciated, the term "hot stick" as used herein is meant to refer to any non-conductive pole for manipulating, at a distance, tools or equipment operating on, or in close proximity to, high voltage lines. Electrical connector tool assembly 402 is configured to permit connector 102 to be inserted therein, permitting electrical connector tool assembly 402 to be used to electrically connect conductors, such as main power conductor 104 and tap conductor 106. As illustrated in FIG. 4, connector 102 has not yet been inserted into electrical connector tool assembly 402; FIGS. 5A and 5B illustrate connector 102 inserted into electrical connector tool assembly 402 prior and subsequent to being installed.

Figure 2:
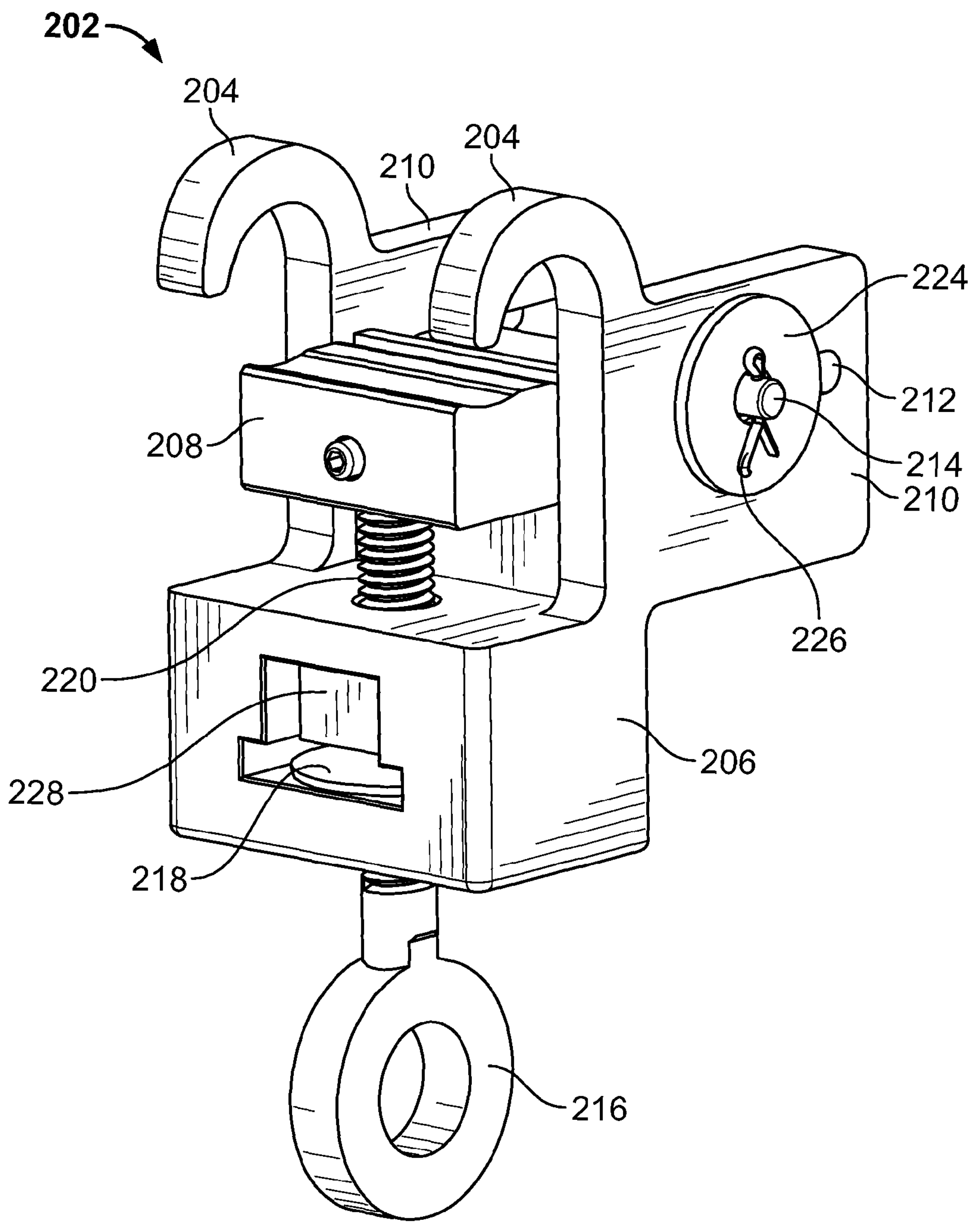
FIG. 2 illustrates a conductor tool according to an exemplary embodiment of the invention.

FIG. 2 illustrates the conductor tool 202 according to an embodiment of the invention. Conductor tool 202 is configured to work in conjunction with a corresponding tool to facilitate assembly of connector 102 as an electrical connector, such as connector tool 302. In the illustrated embodiment, conductor tool 202 is configured to releasably and slidably attach to connector tool 302. Conductor tool 202 includes a plurality of retention members 204, a base 206, a compliance mechanism to exert a force which keeps tap conductor 106 fixed with respect to tap conductive member 112 until connector 102 is fully mated, and a plurality of assembly lobes 210.

Retention members 204 are configured to grasp and/or retain tap conductor 106 in a fixed position with respect to tap connector 112 while connector 102 is being engaged (see FIG. 5A). Retention members 204 are shown as semi circular protrusions shaped in a hook-like geometry but may be any geometry permitting conductor tool 202 to hang from tap conductor 106. As few as one retention member 204 may be included, but any number of retention members 204 may be included.

Base 206 is generally a cuboid structure but may be of any geometry. As illustrated in FIG. 2, base 206 houses a portion of the compliance mechanism. The illustrated compliance mechanism is comprised of plunger 208, an eye loop 216 (which may be substantially similar to a universal stick adapter), a compliance washer 218, a screw 220, and a compliance nut 228. As will be understood by those skilled in the art, various other configurations may be used to act as a compliance mechanism. In one embodiment, the compliance mechanism may include a spring. In another embodiment, the compliance mechanism may include a flexible hook member.

Plunger 208 permits connector 102 to rest on plunger 208 between retention members 204. Plunger 208 controls movement by providing force between plunger 208 and tap conductive member 112. In one embodiment, plunger 208 has a substantially flat surface corresponding with a substantially flat surface on the tap conductive member 112. In another embodiment, plunger 208 may include ridges corresponding with the external geometry of tap conductive member 112. Plunger 208 is configured to provide force upon tap conductive member 112 of connector 102 during installation. The force is provided by the rotation of eye loop 216. Upon the rotation of eye loop 216, screw 220 pushes plunger 208 toward connector 102. When connector 102 provides force against plunger 208, compliance washer 218 and compliance nut 228 provide an opposite force, depressing compliance washer 218 slightly and thereby permitting compliance washer 218, screw 220, plunger 208, and compliance nut 228 to act as a compliance mechanism.

As illustrated, assembly lobes 210 include a plurality of lateral slots 212. Assembly lobes 210 are configured to permit a corresponding tool to fit between them and to be slidably attached thereto by pin 214, which extends through lateral slots 212. The assembly lobes 210 are additionally configured to prevent the corresponding tool from rotating in relation to the conductor tool 202 thereby preventing rotation of connector 102 about the axis of fastener 108. As illustrated in FIG. 2, pin 214 extends through an assembly washer 224; a cotter pin 226 is depicted as preventing pin 214 from falling out of lateral slots 212. As will be readily appreciated, other fastening means permitting assembly and sliding may be used.

Figure 3A:
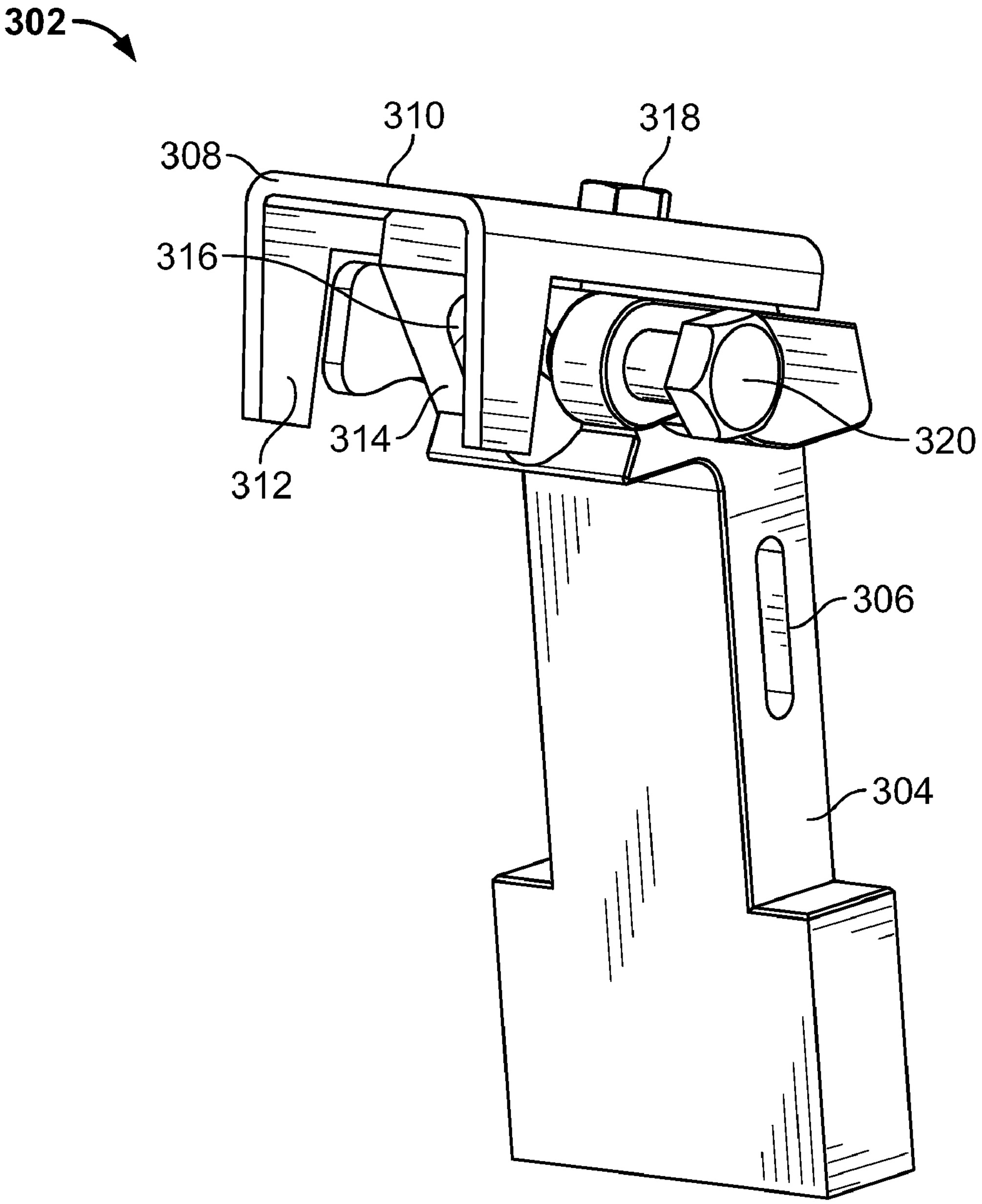
FIG. 3A illustrates a connector tool according to an exemplary embodiment of the invention.

Referring to FIG. 3A, an exemplary embodiment of connector tool 302 according to the invention is illustrated. The connector tool 302 includes an arm portion 304 and a conductor stop 310 adjustably attached to arm portion 304 by top bolt 318. Arm portion 304 includes a substantially vertical slot 306 configured to permit pin 214 from the corresponding tool to be inserted through slot 306, while permitting connector tool 302 to slide substantially vertically along slot 306. Arm portion further includes a guide surface 314 geometrically configured to control movement of main conductive member 110 prior to and during assembly of connector 102. Arm portion 304 includes a lateral bolt 320 configured to abut a portion of electrical connector 102, such as main conductive member 110 of connector 102, while electrical connector 102 is being installed. Upon being rotated, lateral bolt 320 provides force holding main conductive member 110 of connector 102 in place. In relation to connector 102, lateral bolt 320 should be positioned to abut a portion of main conductive member 110 that does not flex during installation of connector 102.

Figure 3B:
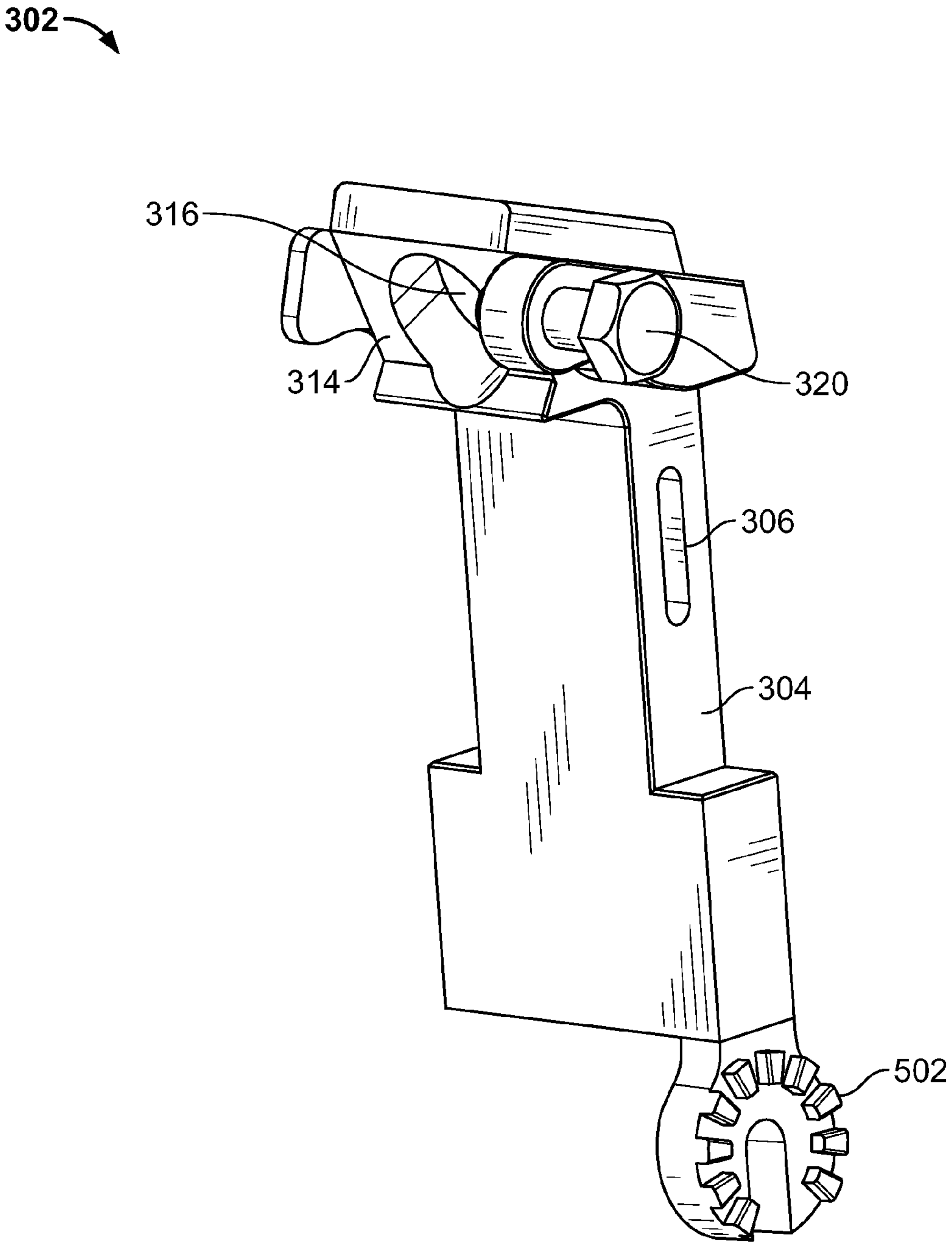
FIG. 3B illustrates a connector tool according to an exemplary embodiment of the invention.

Conductor stop 310 includes guide barrier 312 protruding from a distal end 308 of conductor stop 310. Conductor stop 310 acts to provide a physical barrier over certain regions of connector 102 and defines a distance of maximum travel to the conductor being inserted. Conductor stop 310 may be re-positioned by loosening top bolt 318, sliding conductor stop 310 along a slot adjacent top bolt 318, and tightening top bolt 318. Such re-positioning may prevent conductor 104 from being improperly positioned adjacent to wedge portion 130 of connector 102 or, in embodiments with a plurality of cradles 142 of differing sizes, from being improperly positioned in the wrong sized cradle 142. Proper positioning of conductor 104 is beneficial because positioning conductor 104 in the area covered by guide barrier 312 could prevent connector 102 from properly closing and may result in an inadequate electrical connection. As illustrated in FIG. 3B, in one embodiment, connector tool 302 does not include conductor stop 310.

Connector tool 302 is configured to work in conjunction with a corresponding tool to facilitate assembly of connector 102. In the illustrated embodiment of connector tool 302, connector tool 302 is configured to releasably and slidably attach to conductor tool 202. As best seen in FIG. 3B, guide surface 314 is geometrically configured to provide alignment means for main conductive member 110 of connector 102 while connector 102 is being inserted into connector tool 302. Specifically, the geometrical configuration includes an angled portion corresponding with the external geometry of the wedge portion 130 of connector 102 and a guide recess 316. The guide recess 316 provides clearance to receive fastener head 109 so that the guide surface 314 is in contact with main conductive member 110. Recess guide 316 also limits axial movement of the fastener head 109 away from connector 102. In embodiments in which the fastener 108 includes a square shoulder, this limitation of axial movement by guide recess 316 keeps the fastener head 109 (or flange 111) in sufficient proximity to main conductive member 110 such that at least a portion of the shoulder remains within the fastener bore 118. The fastener bore 118 is sized such that the square cross-section of the shoulder prevents the fastener 108 from rotating with respect to connector 102 when nut 114 is tightened. In another embodiment, guide recess 316 acts as a socket, having a cross-sectional area and depth to prevent head 109, and thus the remainder of fastener 108, from turning as nut 114 is rotated and tightened during installation of connector 102, regardless of the presence of any fastener shoulder.

Referring to FIGS. 5A & 5B, electrical connector tool assembly 402 is configured to facilitate installation of connector 102 to provide an electrical connection. To install connector 102 by using electrical connector tool assembly 402, a utility worker places connector 102, with main conductive member 110 and tap conductive member 112 attached (but not yet fully mated) by fastener 108, into connector tool 302 of electrical connector tool assembly 402. Connector 102 is placed with main conductive member 110 abutting guide surface 314 while permitting fastener head 109 to be positioned in guide recess 316. Lateral bolt 320 is tightened to secure main conductive member 110 of connector 102 in place, while tap conductive member 112 remains attached, but loose, due to fastener 108 not being fully tightened. Then, while plunger 208 is positioned away from tap conductive member 112, conductor tool 202 is manipulated to position tap conductor 106 into the desired cradle 142 of tap conductive member 112. Next, plunger 208 is urged toward tap conductive member 112 by rotation of eye loop 216. Eye loop 216 is tightened until tap conductor 106 is tightly engaged by tap conductive member 112. Connector tool 302 is positioned so that main conductor 104 is in the appropriate cradle 146 of main conductive member 110. In one embodiment, guide barrier 312 of cable stop 310 may be used as a guiding means to prevent improper installation of main conductor 104 by acting as a physical barrier to travel. Upon proper positioning of main conductor 104, nut 114 on fastener 108 is tightened, thereby mating tap conductive member 112 and main conductive member 110 and completing installation of conductor 102 with respect to conductors 104, 106.

To assist in grabbing conductors 104, 106, connector tool 302 and/or conductor tool 202 may be manipulated in a two-dimensional manner. Conductor tool 202 and connector tool 302 may be manipulated while pin 214 slides through lateral slots 212 and slot 306. Such configuration limits the movement of connector tool 302 and conductor tool 202 with respect to each other thereby further preventing rotation of the tools and limiting the tools to two-dimensional movement. In one embodiment, such configuration is desirable because an adapter 502 attached to arm portion 304 may be attached to hot stick 504, which permits maneuvering of connector tool 302. Adapter 502 may be a universal hot stick adapter, which is well known in the art. Similarly, eye loop 216 may be attached to hot stick 504, which permits maneuvering of conductor tool 202. In addition, in one embodiment, in combination with the tightening of nut 114 on fastener 108, manipulation of the connector tool 302 and/or conductor tool 202, directly or by use of hot stick 504, may aid in closing connector 102 to provide an electrical connection.

Upon connector 102 being mated, eye loop 216 may be rotated in the opposite direction to lower plunger 208 and lateral bolt 320 may be rotated in the opposite direction to release tool assembly 402 from connector 102.

While the invention has been described with reference to a preferred embodiment, it will be understood by those skilled in the art that various changes may be made and equivalents may be substituted for elements thereof without departing from the scope of the invention. For instance, the materials disclosed as comprising the embodiments are exemplary and not exhaustive. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An electrical connector tool assembly comprising:

a conductor tool; and a connector tool connected to and cooperable with the conductor tool, the tool assembly for use in connecting a first conductor to a second conductor with an electrical connector;

wherein the tool assembly is adjustably arranged and disposed to receive and removably retain a first conductive member of the electrical connector in the connector tool, and wherein the tool assembly is arranged and disposed to hold the second conductor in place relative to a second conductive member of the electrical connector, and to prevent rotation of the second conductive member with respect to the first conductive member.

2. The tool assembly of claim 1, wherein the conductor tool and the connector tool are slidably attached in a manner permitting movement in substantially only two dimensions with respect to one another.

3. The tool assembly of claim 1, wherein the connector tool comprises:

an arm portion adapted to be attached to a hot stick; and wherein the arm portion further comprises a mechanism arranged and disposed to releasably retain the electrical connector, a guide surface arranged and disposed to receive the first conductive member of the electrical connector, and a guide recess arranged and disposed to receive a portion of a fastener.

4. The tool assembly of claim 3, wherein the mechanism comprises a lateral bolt configured to abut the electrical connector thereby providing a means of retaining the electrical connector in place during installation of the electrical connector.

5. The tool assembly of claim 3, wherein the mechanism is arranged and disposed to permit the electrical connector to flex as the electrical connector is mated.

6. The tool assembly of claim 3, further comprising a conductor stop attached to the arm portion; wherein the conductor stop includes a guide barrier adjustably arranged and disposed to form a barrier to travel of a conductor inserted into the electrical connector.

7. The tool assembly of claim 1, wherein the conductor tool comprises:

a base adapted to be attached to a hot stick; and at least one retention member extending away from the base and configured to hold the second conductor in place with respect to the electrical connector second conductive member.

8. The tool assembly of claim 7, the conductor tool further comprising a compliance mechanism configured to exert a force on the second conductive member, thereby securing the second conductor between the second conductive member and the retention member.

9. The tool assembly of claim 8, wherein the compliance mechanism comprises a plunger, a compliance washer, a screw, and a compliance nut.

10. The tool assembly of claim 1, wherein the connector tool comprises:

an arm portion; and a conductor stop movably attached to the arm portion, the conductor stop arranged and disposed to form a barrier to travel of a conductor inserted into the electrical connector;

and wherein the conductor tool comprises:

a base;

at least one retention member extending away from the base and configured to hold the conductor in place with respect to the second conductive member; and a compliance mechanism configured to exert a force on the second conductive member, thereby securing the second conductor between the second conductive member and the retention member.

11. The tool assembly of claim 1, wherein the electrical connector comprises:

a first conductive member comprising a first hook portion extending from a first base wedge portion, the first hook portion adapted to engage the first conductor;

a second conductive member comprising a second hook portion extending from a second wedge portion, the second hook portion adapted to engage the second conductor, wherein the first wedge portion and the second wedge portion are adapted to nest with one another and be secured to one another; and a displacement stop located on the second conductive member, the first hook portion engaging the displacement stop to define a final displacement relation between the first and second conductive members once fully mated.

12. The tool assembly of claim 11, wherein the electrical connector comprises a plurality of cradles configured to engage conductors of varying gauges; and an external geometry configured to engage the tool assembly and thereby prevent rotational movement of the electrical connector when it is inserted into the tool assembly.

13. A connector tool comprising:

an arm portion adapted to be attached to a hot stick; and wherein the arm portion further comprises a mechanism arranged and disposed to releasably retain an electrical connector having a first conductive member connected to a second conductive member by a fastener, a guide surface arranged and disposed to receive the first conductive member of the electrical connector, and a guide recess arranged and disposed to receive a fastener head; and wherein the connector tool is arranged and disposed to be cooperable with a second tool.

14. The connector tool of claim 13, wherein the mechanism comprises a lateral bolt configured to abut the electrical connector thereby providing a means of retaining the electrical connector in the connector tool during installation of the electrical connector.

15. The connector tool of claim 13, wherein the mechanism is arranged and disposed to permit the electrical connector to flex as the electrical connector is mated.

16. The connector tool of claim 13, further comprising a conductor stop forming a barrier to travel of a conductor inserted into the first conductive member and adjustable with respect to the arm portion to vary the location of the conductor with respect to the first conductive member.

17. The connector tool of claim 13, further comprising a hot stick attached to the connector tool.

18. The connector tool of claim 13, wherein the guide recess establishes a maximum distance of axial travel of the fastener.

19. The connector tool of claim 13, wherein the guide recess is further arranged and disposed to prevent the fastener head from rotating within the guide recess.

20. A conductor tool for use with an electrical connector having a first conductive member connected to a second conductive member by a fastener having an axis, the conductor tool comprising:

a base adapted to be attached to a hot stick;

at least one retention member extending away from the base and configured to hold a conductor in place with respect to the second conductive member; and wherein the conductor tool is cooperable with a second tool.

21. The conductor tool of claim 20, further comprising a compliance mechanism configured to move the electrical connector second portion in a direction away from the base.

22. The conductor tool of claim 21, wherein the compliance mechanism comprises a plunger, a compliance washer, a screw, and a compliance nut.

23. The conductor tool of claim 20, further comprising a hot stick attached to the conductor tool.

* * * * *